May 14, 1968  B. M. GORDON  3,383,498
DIGITAL CIRCUIT
Filed Dec. 18, 1964

A — SYNCHRONIZER OUTPUT

B — FLIP-FLOP OUTPUT

C — COUNTER STATE

D — CLOCK PULSE TRAIN

E — SAMPLING INTERVALS

F — DISPLAY

*INVENTOR.*
BERNARD M. GORDON
BY Robert J. Schiller
ATTORNEY 3,383,498
DIGITAL CIRCUIT
Bernard M. Gordon, Hesperus Ave.,
Magnolia, Mass. 01930
Filed Dec. 18, 1964, Ser. No. 419,377
12 Claims. (Cl. 235—92)

ABSTRACT OF THE DISCLOSURE

A system for digitally counting a number of signals using only a single digital counter capable of counting only digits of $R^1$ significance where R is the radix of the numerical counting system. The device includes a control which gates the signals to the counter for a predetermined time period. The state of the counter is successively sampled during that period at the end of a number of intervals, each of which commences with the beginning of the time period, each interval being a unique fraction, $1/R^n$, of the time period.

---

Figure 1:
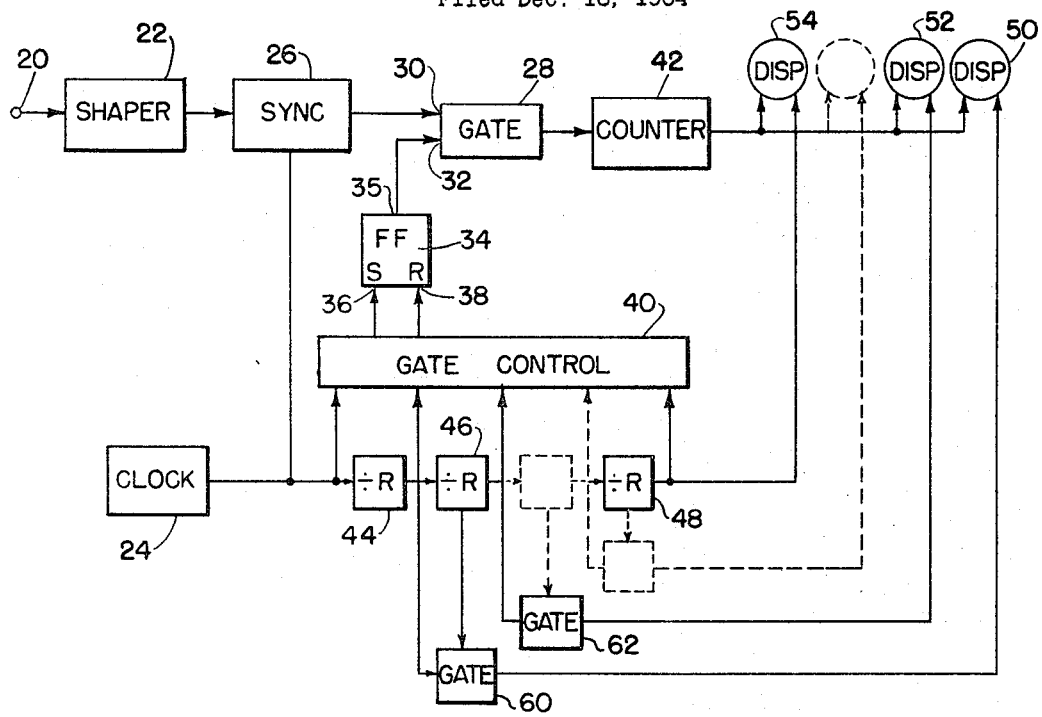

This invention relates to devices for measuring events per unit time, and particularly to novel apparatus for determining the repetition rate or frequency of a string of discrete signals.

A number of counting devices, known as events per unit time meters, measure the repetition rate or frequency of an oscillatory or periodic input signal and generate an appropriate digital output. These devices usually operate simply by sampling the input signal over a precisely determined base period and by counting the sample. To define the base period, the usual practice is to couple the output of a precision pulse oscillator or digital clock to a series arrangement of that number of decade frequency dividers sufficient to insure that the interval between carry signals from the last frequency divider is equal to the desired base period. The input signal is sampled by gating means which is enabled and disabled at the beginning and end of a base period. The gated signals are typically fed to a chain of decimal counters which continuously record the count. The state of the counters can be read out (for storage or display or both) either continuously during the base period or, can be transferred only at the end of the base period. In either case, the ultimate count is usually a multidigit number, no digit of which is available for utilization as a true or final value until the base period has expired.

A typical state-of-the-art-events-per-unit-time meter may have a six place decimal digital display and provide frequency measurements over base periods of one second, the latter being generated as by a 1 mc. oscillator. Such a meter then would require at least six decimal counters to count gated signals and six decade dividers to define the base gating period.

A principal object of the present invention is to provide novel apparatus for measuring events per unit time wherein the final values of a measurement are obtained in sequence during that unit time.

Another principal object of the present invention is to provide novel apparatus for measuring events per unit time which apparatus is significantly simple and less expensive in that only a single, digital units counter is employed to count gated signals.

According to the principles of the present invention, means are provided for counting repetitive signals during a gated period, and providing a digital output signal representative of the number of repetitions counted. To effect this, the present invention generally comprises gating means, timing means for establishing a base sampling period, means for so coupling the timing means to the gating means as to control the gating of the latter; a single, digital units counter; and means for sampling the state of the counter at the end of sampling intervals which are predetermined fractions of the base period.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

Figure 2:
Figure 2:
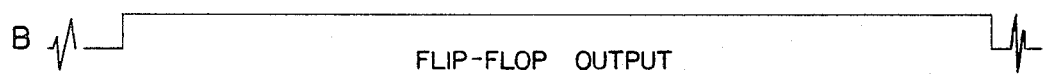
Figure 2:
Figure 2:
Figure 2:
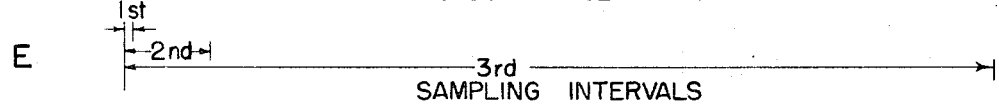
Figure 2:

For a fuller understanding of the nature and objects of the present invention, reference should be had to the following detailed description taken in connection with the accompanying drawings, wherein:

FIG. 1 is a block diagram showing an embodiment of the principles of the present invention; and FIG. 2 is a timing diagram showing, on a common time axis, exemplary pulse forms at various points of the embodiment of FIG. 1 during operation thereof over a specified base period.

The embodiment of the present invention as shown in FIG. 1 contemplates the measurement of an input signal which is oscillatory or repetitive, and for the base time period, T, over which the repetition rate or frequency of the signal is to be determined, is quasi-stable. While the latter condition is not necessary, it is, of course, highly desirable in order that the resulting measurement be meaningful. The embodiment shown in FIG. 1 includes an input terminal 20 at which such an input signal is to be applied. Terminal 20 is connected to the input of means, such as shaper 22, optionally provided for converting the input signals into a pulse train in which the form factor of the pulses is appropriate for input to other elements and is compatible with other signals in the embodiment of FIG. 1. The repetition rate of the output pulse train from shaper 22 remains identical to that of the signal applied at input terminal 20. Shaper 22 is typically a Schmitt trigger circuit and may also include means for both amplifying and attenuating the input signal.

The invention includes means for providing reference time signals, as from a precise, reference time-base, pulse oscillator or digital clock 24. The latter may be included as an internal source as shown, or alternatively, the invention can merely comprise a reference terminal at which such signals are applied from an external source. Clock 24 is characterized as generating a series of equally spaced pulses having a periodicity which is a predetermined sub-multiple or fraction of the time base period.

The output of shaper 22 is connected to one input of synchronizer 26, another input of the synchronizer being connected to the output of clock 24. Synchronizer 26 is a device of known structure having an output at which pulses appear only in synchronism with clock pulses applied at the appropriate input. For example, one can assume that a signal pulse train is applied from shaper 22 to one input of synchronizer 26, and a reference pulse train is applied at the other input of synchronizer 26 from clock 24. The repetition rate of the pulse train from clock 24 is preferably set at a greater magnitude than the maximum repetition rate of the pulse train from shaper 22 to insure there will be output pulses from synchronizer 26 equal in number to the input pulses thereto from shaper 22. The output pulses from synchronizer 26 then occur at "clock time" i.e. synchronously with the clock pulses both with respect to input signal pulses occurring simultaneously with clock pulses, and following receipt of input signal pulses at asynchronous time.

Gating means such as coincidence or control gate 28, are provided for selectively controlling transmission of pulses from synchronizer 26. To this end, control gate 28 has signal input terminal 30 and enabling input terminal 32, the latter of which is coupled to the output of synchronizer 26. Enabling input terminal 32 is connected to a source of timing signals which allow enablement of the control gate only for a carefully predetermined base time. Enabling signals are preferably provided by a bistable device such as flip-flop 34, one output of which, such as assertion output 35, is connected to terminal 32. Flip-flop 34 has the usual set and reset input terminals 36 and 38. Flip-flop 34 characteristically provides an enabling signal at output 35 upon one of terminals 36 and 38 being triggered, and when the other of the set and reset terminals is triggered, the enabling signal is removed from the output of the flip-flop.

Means, such as gate control 40 are provided for applying triggering, for example, to set input terminal 36 of flip-flop 34 at the beginning of a base time period, preferably such that the enabling signal then provided at terminal 32 is synchronous with a pulse of the output train from synchronizer 26. Gate control 40 is coupled to clock 24 in order to insure that the set input of flip-flop 34 will become thus synchronously triggered. The gate control preferably allows for selection of a base time period, and includes means for providing that at the end of the base period, reset terminal 38 of the flip-flop is triggered so as to remove the enabling signal from gate 28.

Thus, at the start of a base time interval T, for example $t_0$, gate 28 can be enabled and after $\Delta t$, the full first period between pulses from synchronizer 26 following enablement of the gate, the pulses in the signal train from synchronizer 26 are passed by gate 28.

The output of gate 28 is connected directly to the input of a single, digital-units counter 42 which counts sequentially and cyclically according to a predetermined numerical system based upon a particular radix. For example, counter 38 can be a single decimal counter capable of only counting cycles of units in sequence from 0 to 9, or a binary counter capable of only counting similarly from 0 to 1, or the like.

The invention includes means for dividing the base time interval T into a group of different sampling intervals, which intervals all commence at $t_0$, and for sampling or determining the state of counter 42 at the end of each such interval. Each sampling interval is a fraction of the base time interval determined as the quotient of the base time interval (expressed in the numerical system based on radix R) to a different positive power of the radix. The longest sampling interval can be termed the base time interval T. Preferably, the group of intervals is determined as a sequence accordingly as the positive powers of the radix are successive integral exponents. Thus, for example, the magnitude of the period of the clock (expressed in the numerical system of radix R as $1 \times (TR^{-n})$, $n$ being the largest exponent) can be used as the shortest sampling interval. By dividing the clock pulse train frequency $t$ by the radix R (or multiplying the clock period by the radix) there is provided a second reference pulse train having a period or second sampling interval of magnitude $1 \times (TR^{-(n-1)})$. The next largest sampling interval is similarly determined by means for dividing the second reference pulse train frequency by the radix so as to provide a third reference pulse train having a yet larger period.

By successively dividing a previous reference pulse train thus originally derived from the clock, one obtains a sequence of reference pulse trains each having a period varied according to successively smaller positive powers of the radix, thus $1 \times TR^{-(n-2)}$, $1 \times TR^{-(n-3)}$ etc., until one obtains a period of $1 \times TR^{-(n-n)}$ which, by definition is T.

In order to provide the desired sampling intervals, there is included a number of frequency dividers, such as single, digital-units counters providing a cyclic count in a number system preferably based on the same radix, R, and providing a unit carry signal at the end of each cycle. Thus, the frequency dividers, shown as 44, 46, and 48, are shown assembled in series such that the input of divider 44 is connected directly to the output of clock 24, the input of each divider thereafter being connected to the carry output of each prior divider in the series. The output of each divider is also coupled to gate control 40 so that any of the various sampling intervals provided by the series of chain of dividers can be used as the base time interval according to appropriate setting of the gate control. Thus, it will be apparent that, in its simplest form, gate control 40 need only comprise a switch for coupling the clock reference pulse train to input 36 of the flip-flop and for coupling the output of one of the frequency dividers to input 38.

The invention also includes, for sampling the state of the counter, a plurality of read-out or storage devices, shown at 50, 52, and 54, each of which has signal input terminal connected to the output of counter 42. Each storage device also has a latching terminal at which it is couplable to the output of a respective one of the frequency dividers. In the embodiment shown, each read-out device is preferably a storage display module of the type capable of providing, in the notation based upon radix R, an indication of the state of the counter existing at the time an output carry or command signal from the associated frequency divider is received.

Such storage display module typically will store each indication during transfer from and further counting by counter 42 until the indication is released from storage or erased, as by the next command signal received by that module.

With the exception of the last divider in the chain (i.e. the divider providing the pulse train with the longest period) the output of each of the frequency dividers is preferably gated through a respective display gate to corresponding latching terminals of the storage devices. Thus, the output of divider 44 is connected to the timing signal input terminal of display gate 60, the output of the latter being connected to the latching terminal of storage device 50. Similarly, the output of divider 46 is connected to the timing signal input terminal of display gate 62. The output of gate 62 is connected to the latching terminal of storage device 52. The output of the last divider 48 is connected directly to the latching terminal of storage device 54. Each of the display gates is also provided with an inhibit input terminal such that, when an inhibiting signal is applied thereto, the display gate is inhibited or disabled and cannot pass a command signal applied thereto from the divider connected to its timing signal input terminal. The inhibit terminal of each of gates 60 and 62, is, therefore, connected to the counting mechanism of the frequency divider next in sequence after the frequency divider whose output is connected to the respective timing signal input terminal. Thus, display gates become inhibited when, in the counting mechanism coupled to its inhibit input terminal, the count becomes other than zero. In the case of the first carry signal counted, a slight delay in counting is required to avoid immediate inhibition of the display gate. These gates serve as means for insuring that one and only one storage device is activated, as to erase its previous indication and store the instantaneous state of the counter, at a given time; i.e. only one sampling is taken of the counter state at the end of each sampling interval.

The number, $n$, of significant digits to which the repetition rate of the input signal at terminal 20 is to be determined, establishes the number of individual storage devices and frequency dividers employed.

Obviously too, there will be $n-1$ display gates. That the number of storgae devices, display gates, and frequency dividers is based upon the number of significant digits desired in the ultimate determination and, is therefore a flexible quantity, is indicated by the broken lines showing such elements in FIG. 1. It will be also apparent that the number $n$ of significant digits desired is the largest positive exponent of the radix in the denominator of the quotient hereinbefore described.

The principles of the present invention are applicable to a number of devices having varied applications, for example, the signals indicative of the state of the counter 42 made available at the end of each sample interval can be used as input signals to digital equipment other than display devices. Indeed, the storage devices heretofore described can be electronic, electromechanical, or the like. As an input device to the present invention one can employ a known voltage-controlled pulse oscillator to yield a pulse train having a repetition rate which is a linear function of the control voltage, so that the present invention can form part of an analog-to-digital converter, or a digital voltmeter, or the like.

For simplicity in describing the operation of the present invention it will be useful, by way of example to consider specific structures and quantities in connection with the description of FIG. 1. For example, clock 24 can be assumed to be a pulse oscillator which provides a pulse train having a repetition rate or frequency of one thousand pulses per second. Counter 42 can be assumed a single stage, digital decimal counter. The frequency dividers, therefore, are individual decade dividers. It may also be postulated that the exemplary input signal whose repetition rate is to be determined is a 24 pulse per second signal, and that $n=3$, so that there are three display modules and, therefore, three sampling intervals requiring only three frequency dividers and two gates. It is to be further understood that the present invention is not limited to the magnitudes and quantities given, but have been selected merely for convenience in illustration.

Because the clock period of the clock pulse train is $\frac{1}{1000}$ second, the output of synchronizer 26, shown in FIG. 2A will, therefore, assure that each signal pulse occurs synchronously with a clock pulse. Now, it can be assumed that set terminal 36 of flip-flop 34 becomes connected by gate control 40 to the output of clock 24 and thus triggered so that the flip-flop output rises at time $t_0$, as shown in FIG. 2B, and enables control gate 28. Counter 42 thereafter counts the signal pulses from synchronizer 26 which have passed through enabled gate 28. As shown in FIG. 2C the first signal pulse counted by counter 42 occurs at $t_0+\frac{40}{1000}$ second, thereby changing the state of counter 42 from "0" to "1"; the next pulse is counted at $t_0+\frac{80}{1000}$ second, changing the counter state to "2"; and this continues until the counter cycles from 9 to 0 and starts counting up again.

The first frequency divider 44 in sequence counts every 10th pulse from clock 24 and, therefore, provides an output reference pulse train having a repetition rate of 100 cycles per second, as shown in FIG. 2D, thus establishing the first sampling interval. The first carry signal from divider 44 is applied as a latching command signal to storage display device 50 through gate 60 and is also then counted by next divider 46, gate 60 becoming thereafter inhibited. This command signal causes whatever display or indication is stored on device 50 to be erased and also causes the state of counter 42 at $t_0+\frac{1}{100}$ second, as shown in FIG. 2E, to be stored and displayed as shown in FIG. 2F. As previously noted, the counter state at the end of the first sampling interval is 0 and this is the corresponding data stored and displayed as the result of the first latching signal. The storage display device typically can be a module such as that currently commercially available from Janus Control Corporation, Newton, Mass., under the trade designation of Model B–100–2.

Because every 10th pulse in the output of first frequency divider 44 is counted by the next or second frequency divider 46, the latter has a corresponding output reference pulse train with a period of $\frac{1}{10}$ second. The first carry pulse or output from the second frequency divider 46 is passed by its corresponding display gate 62 and is applied to the latching terminal of second storage display device or module 52 which is responsively first erased and then has transferred to and stored therein, the state of the counter at that time. As will be seen from FIGS. 2C and 2E the counter state at $t_0+\frac{1}{10}$ second is "2"; as shown in FIG. 2F this then becomes the data transferred to and displayed by the second module. Every 10th pulse in the output of second frequency divider 46 is counted by last frequency divider 48 which, therefore, provides its first output reference pulse as a command signal to the latching terminal of display device or module 54 at the end of the base time interval T, i.e., the last sampling interval of one second. The state of the counter transferred and displayed at the end of base time interval T is "4," as shown in FIGS. 2E and 2F.

It will be apparent that, in the operation of the invention, the first digit which becomes available at the end of the minimum or smallest sampling interval is the most significant digit. The other digits are determined in time in the order of their decreasing significance, the least significant digit being the last to be determined. This, of course, is the "natural" order in which a string of digits is usually read by a human viewer.

The principles of the present invention may be varied so as to allow a reversal of the order in which digits are determined, i.e. least significant digit first. In such case, for example, the single decade counter of the invention would be allowed to count for a second to determine the least significant digit; thereafter it would be reset to 0 and sampled again after $\frac{1}{10}$ second to determine the next most significant digit, and so on.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. Apparatus for determining a number of signals occurring during a unit time period, said apparatus comprising, in combination,
   a single, digital, units counter;
   means for gating said signals to said counter for only said unit time period; and
   means for successively sampling, during said period, the state of said counter at the end of each of a plurality of time intervals commencing at the beginning of said period and being a different fraction of said period.

2. Apparatus for determining a number of signals occurring during a unit time period, said apparatus comprising, in combination,
   a single, digital, units counter for counting said signals according to a numerical system having a specified radix,
   means for gating said signals to said counter for only said unit time period; and
   means for successively sampling, during said period, the state of said counter at the end of each of a plurality of time intervals, each of said intervals starting at the beginning of said period and being a different fraction of said period determined as an inverse of a different positive power of said radix.

3. Apparatus as defined in claim 2 wherein said fractions are a group determined as a sequence of inverses of successively smaller, integral positive powers of said radix.

4. Apparatus for determining a number of signals occurring during a unit time period, said apparatus comprising, in combination,
   a single, digital, units counter;
   means for gating said signals to said counter for only said unit time period;
   means for successively sampling, during said period, the state of said counter at the end of each of a plurality of time intervals, each of said intervals starting at the beginning of said period and being a different fraction of said period; and means for storing and displaying a plurality of digits each of which corresponds to a sampling made of the state of said counter at the end of a respective one of said plurality of time intervals.

5. Apparatus for determining a number of signals occurring during a unit time period, said apparatus comprising, in combination, a single, digital, units counter;

means for gating said signals to said counter;

means for enabling said gate to pass signals to said counter only for a period equal to said unit time period;

means for defining said unit time period and comprising a plurality of frequency dividers in series adapted to be coupled to a source of repetitive reference signals; and means for successively sampling, during said unit time period, the state of said counter at the end of each of a plurality of time intervals, each of said intervals starting at the beginning of said unit time period and being established by the periodicity of the output signals of a respective different one of said frequency dividers.

6. Apparatus as defined in claim 5 wherein said counter is adapted for counting according to a numerical system having a specified radix, and each of said frequency dividers are adapted to divide according to said system.

7. Apparatus for determining a number of signal pulses occurring during a unit time period, said apparatus comprising, in combination, a single, digital, units counter;

a source of reference time pulses;

means for synchronizing said signal pulses with said time pulses;

means for gating said signal pulses to said counter following synchronization of said signal pulses with said time pulses synchronously with said time pulses as to pass the synchronized signal pulses to said counter only during said unit time period;

means for deriving said unit time period from said time pulses and comprising a plurality of frequency dividers in series coupled to said source of reference time pulses; and means for successively sampling, during said unit time period, the state of said counter at the end of each of a plurality of time intervals, each of said intervals starting at the beginning of said unit time period and being established by the periodicity of the output signals of a respective one of said frequency dividers.

8. Apparatus for determining a number of signal pulses occurring during a unit time period, said apparatus comprising, in combination, a single, digital, units counter;

a source of reference time pulses;

means providing timing signals defining said unit time period and comprising a plurality of frequency dividers coupled in series to said source of time pulses;

means controlled by said timing signals for gating said signal pulses to said counter during only said unit time period;

means for successively sampling, during said unit time period, the state of said counter at the end of each of a plurality of time intervals; each of said intervals starting at the beginning of said unit time period, and being established by the periodicity of the output signals of a respective one of said frequency dividers; and means for storing and displaying a plurality of digits each of which corresponds to a sampling made of the state of said counter at the end of a respective one of said plurality of time intervals.

9. Apparatus as defined in claim 8 wherein said means for storing comprises a plurality of storage devices each for storing a respective digit of said plurality of digits;

said apparatus including gates connected between the output of each, except the last in said series, of said frequency dividers and a corresponding one of said storage devices, said gates constituting means for limiting the activation of said storage devices by signals from said dividers such that only a predetermined one of said devices can store a digit at the end of a given one of said intervals.

10. In apparatus for counting a number of discrete signals for a unit time period and including a digital clock, a chain of dividers for dividing the clock frequency by successive decades, a gate for controlling transmission of said signals, and means for enabling the gate for a unit time period as determined by said dividers, the improvement comprising, a single decimal counter connected for counting the output signal from an output terminal of said gate;

a plurality of latching storage display elements each having an input signal terminal connected to the output terminal of said gate and latching input command terminal;

each means coupling the output of each of said dividers to a respective command terminal, each display element being characterized in providing a display of the decimal digit existing in said counter upon receipt at its command terminal of an output signal from the divider coupled thereto.

11. Apparatus as defined in claim 10 wherein said means coupling the outputs of each divider, except the last divider of said chain, includes a gate having an output connected to a respective command terminal and an input connected to a divider output;

each gate being connected so as to inhibit passage of output signals from the output of a given divider when the count is other than zero in the divider next in sequency after said given divider.

12. Apparatus as defined in claim 11 including a synchronizer for providing said discrete signals to said gate in synchronism with the period of said digital clock.

References Cited

UNITED STATES PATENTS

| 2,851,596 | 9/1958 | Hilton | 235—92 |
| 3,221,250 | 11/1965 | An Wang | 324—78 |
| 3,328,564 | 6/1967 | Stuart | 235—92 |
| 3,340,386 | 9/1967 | Hurst | 235—92 |

MAYNARD R. WILBUR, *Primary Examiner.*

G. J. MAIER, *Assistant Examiner.*